Aug. 21, 1934.    E. A. THOMPSON    1,970,716
TRANSMISSION WITH TAPERED ROLLER BEARINGS
Filed April 7, 1932    2 Sheets-Sheet 1
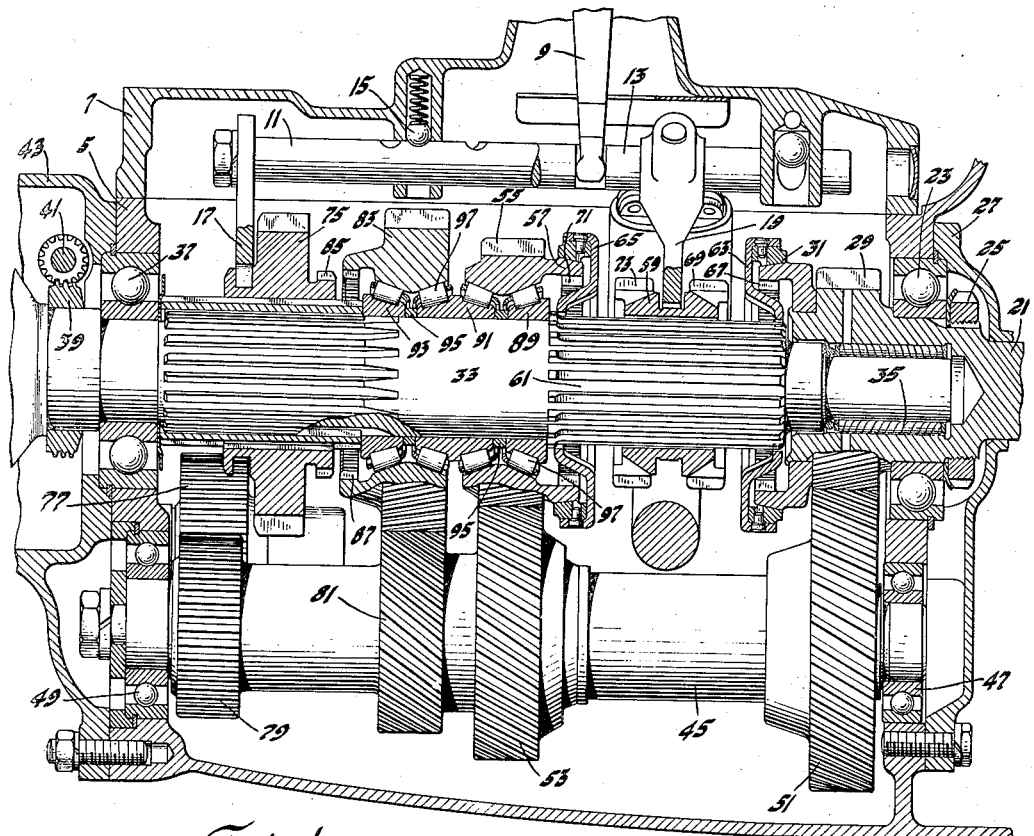
Fig.1
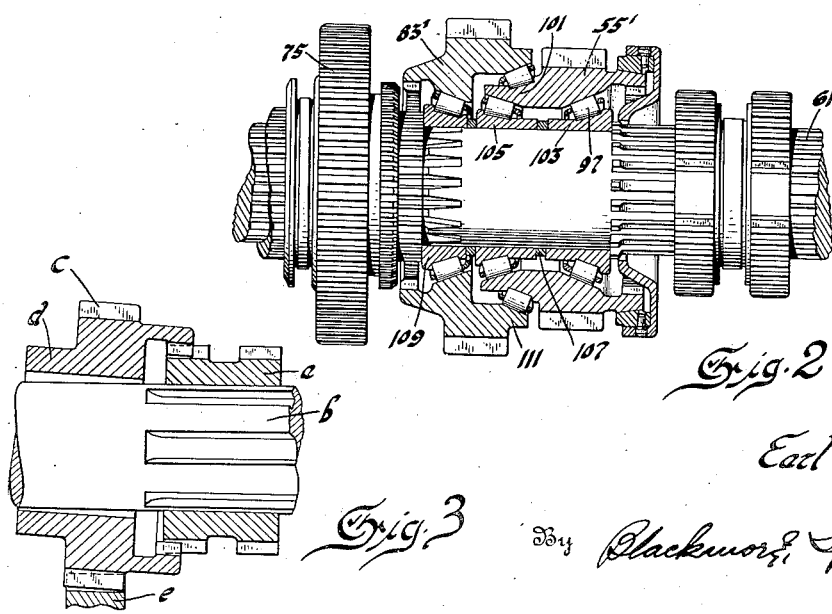
Fig.2
Fig.3
Inventor
Earl A. Thompson
By Blackmore, Spencer & Flint
Attorneys Inventor
Earl A. Thompson
By Blackmore, Spencer & Flint
Attorneys Patented Aug. 21, 1934

1,970,716

UNITED STATES PATENT OFFICE 1,970,716

TRANSMISSION WITH TAPERED ROLLER BEARINGS

Earl A. Thompson, Birmingham, Mich., assignor to General Motors Corporation, Detroit, Mich., a corporation of Delaware Application April 7, 1932, Serial No. 603,739

11 Claims. (Cl. 74—333)

This invention relates to power transmission gearing, and has been designed to provide an improved transmission mechanism for vehicles.

An object of the invention is to improve the bearing support of a rotatably mounted helical gear.

Another object is to avoid frictional drag between the gear hub and the shaft upon which it is mounted.

A further object is related to the foregoing and is to improve the action of synchronization when the gear is to be clutched to the shaft.

A still further and important advantage lies in the possibility of shortening the length of the change speed transmission.

Other advantages will be understood from the following description.

In the drawings accompanying this description—

Fig. 1 is a longitudinal sectional view through a change speed transmission.

Fig. 2 is a similar view of a portion of such a transmission showing a modified form of the mounting of the driven second speed and low speed gears.

Fig. 3 is a diagrammatic view.

Figure 4:
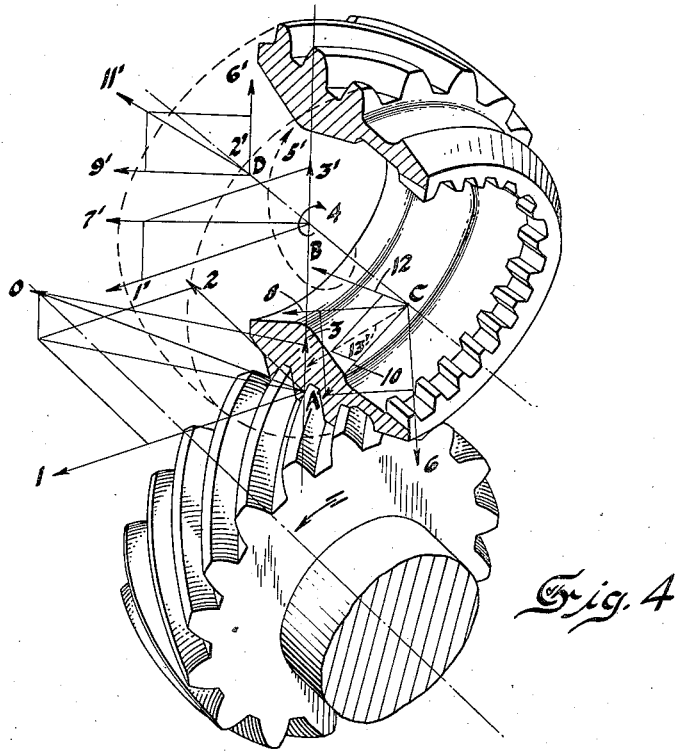
Fig. 4 is a perspective of a gear train showing force diagrams.

Referring by reference characters to the drawings, numeral 5 represents a transmission housing having a cover 7 through which extends the conventional gear shift lever 9. At 11 and 13 are shown two shift rods which are to be engaged by the transverse movement of the lever 9 and independently reciprocated by longitudinal movements of the lever. Spring detents are provided for holding the shift rods in their positions of adjustment, one of said spring detents being shown by numeral 15. At 17 is shown a fork carried by shift rod 11 and intended to control the shifting for low speed and reverse. Numeral 19 represents the fork which is associated with rod 13 and its movements control the shifting from neutral into high speed or second speed.

The driving shaft of the transmission is represented by numeral 21. It enters the front end of the housing where it is supported by bearings 23. There is shown a retainer 25 and a closure plate 27, which details constitute no part of the invention. This shaft 21 within the housing wall is provided with a helical gear 29 which constitutes the driving gear of the so-called constant mesh train. Just beyond the gear 29 the shaft is provided with a frictional clutch element 31 which, as will be explained, is to cooperate with another clutch to effect synchronization in the act of shifting.

At 33 is shown the driven shaft which at its front end is supported by bearings 35 in the recessed end of shaft 21. Shaft 33 is also supported by bearings 37 located in the rear end wall of the transmission housing 5. Outside the transmission housing proper there are gear elements 39 and 41 which are housed within a secondary casing member 43. These gears 39 and 41 are intended to drive the conventional speedometer.

At 45 is shown a countershaft which, as usual, is parallel to the driven shaft 33 and is supported by bearings 47 and 49 in the front and rear walls respectively. The countershaft carries a helical gear 51 which is in engagement with gear 29, the gears 29 and 51 constituting the constant mesh train. At 53 is another helical gear carried by the countershaft. This gear is in mesh with gear 55 which is rotatably supported on the driven shaft 33. The gear 55 has rigid therewith a frictional clutch element at 57.

Numeral 59 represents a double clutch operated by the shift fork 19 on a splined portion 61 of the driven shaft. Numerals 63 and 65 designate frictional clutch elements which rotate with shaft 33, being held from relative rotation by the splines 61. The friction element 63 is designed to cooperate with the friction element 31 of the driving shaft, and the friction element 65 cooperates with the friction element 57 of gear 55. 67 and 69 are cooperating clutch teeth, one on the driving shaft and the other on the forward part of the sliding clutch member 59. Numerals 71 and 73 also represent engageable clutch teeth, one on the gear 55 and the other at the rearward part of the double clutch member 59. It may be here explained that when the member 59 is moved forward or rearward it first effects synchronization through the frictional clutches and thereafter direct engagement through the clutch tooth elements.

75 is a gear which is mounted for rotation with shaft 33 but slidable therealong. It is carried by a second splined portion of the shaft 33 as illustrated and is reciprocated by the shift fork 17. Numeral 77 represents a reverse idler which is to be at times engaged by gear 75 and is itself driven by a gear 79 rigid with the countershaft 45. Numeral 81 represents another gear on the countershaft, this gear being of helical form and is in constant mesh with gear 83, also a helical gear rotatably mounted on the driven shaft and located near gear 55. Numerals 85 and 87 represent clutch teeth on gear 75 and gear 83 respectively. It may be explained that when gear 75 is moved to effect the engagement of teeth 85 and 87, the helical gear 83 is locked from rotation relative to shaft 33, and a low speed drive is effective.

The invention is primarily concerned with the mounting of gears 55 and 83. Three inner races 89, 91, and 93 are carried by shaft 33 between the two splined portions of said shaft. These inner races are spaced by suitable rings 95. 97 represents tapered roller bearings of which one is associated with each of the end races and two of which are used with the intermediate race 91. The inner tapered faces of gears 55 and 83 constitute the outer bearing races. The two tapered bearings associated with race 91 engage adjacent faces of gears 83 and 55, and the end tapered roller bearings engage the remote faces of these gear members.

No novelty is claimed for the transmission per se. As will be understood by one familiar with transmissions of this kind, when clutch 59 is moved to the right the driven shaft is first synchronized with the driving shaft and then directly engaged therewith by the jaw teeth. The drive is then at high speed. A movement of 59 to the left synchronizes the rate of rotation of teeth 71 and 73 after which they positively engage for a drive in second speed. When driving in second speed not only is the act of engagement made quiet by synchronization, but the use of helical gears constitute a quiet driving mechanism. Driving in low speed is also quiet because of the use of helical gears 81, 83. Low speed is effected by sliding gear 75 forward to engage the clutch teeth 85, 87. Driving in reverse is accomplished by moving gear 75 to the left and into engagement with the reverse idler 77.

The inventive idea is concerned with improved bearings for gears 55 and 83, the improved mounting for these gears being such as to reduce the otherwise greater axial length of the bushings. It also lessens the frictional drag between the gears and the shaft, and owing to the lessened drag facilitates the act of synchronization. The advantages may be better understood by a consideration of the diagrammatic view (Fig. 3) where the roller bearings are not shown and where the tendency of the gear to be axially displaced is exaggerated. Here $a$ is the clutch slidable on shaft $b$. A gear $c$ is mounted for rotation relative to the shaft but is designed to be clutched to the shaft by the clutch element $a$. The gear $c$ has a more or less elongated hub $d$. It will be obvious that the clutch $a$ engages the cooperating teeth of clutch $c$ and holds that end of the gear hub in concentric relation to the shaft. The driving gear $e$ which is in engagement with gear $c$ tends to displace the axis of the gear hub relative to the axis of the shaft. To minimize this displacement bushings may be used of considerable length, but such a structure adds to the length of the gear hub and consequently to the length of the transmission as a whole. When such bushings are used there is still some displacement of the gear from coaxial relation with the shaft, and to accommodate such displacement it is necessary or advisable to cut the teeth at a slight angle to approximately centralize the pressure. If the length of the hub and bushing are reduced the gear teeth will have to be cut at an excessive angle and such an arrangement would be unsatisfactory and would vary with different installations. Roller bearings would reduce the frictional drag and would facilitate synchronization. The roller bearings would not, however, obviate the necessity for a considerable length of bearing surface.

When helical gears are used it is not practical to modify the shape of the gear teeth to accommodate displacement of the gear. It has been found that the difficulty may be overcome by the simple expedient of supporting the rotatably mounted gear by a tapered bearing (ball, roller, or plain) provided there be such an angle between a line normal to the bearing surface and the direction of the bearing load as to tend to move the gear up the tapered bearing. This angle need not and should not be excessive. It is only necessary that E—14 lie to the left of E—F in Fig. 5, for example as is explained below.

Figure 5:
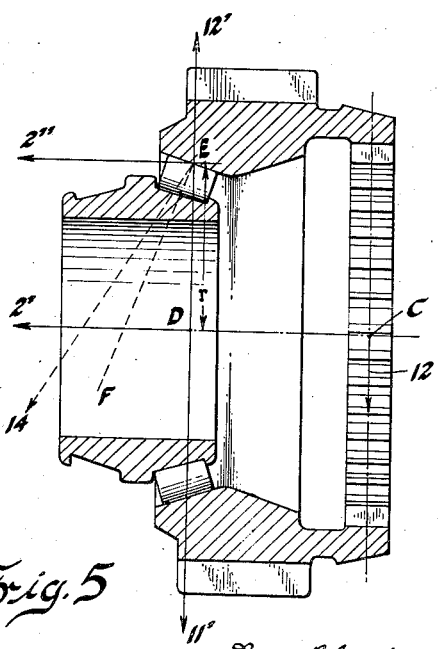
Fig. 5 is a section in the plane of force 11' shown on Fig. 4.

For a better understanding of the invention reference is made to Fig. 4 and Fig. 5. The two gears of these figures may be considered to be gears 53 and 55 of Fig. 1. Fig. 4 shows the equivalent of gear 55 cut away to illustrate the several forces and their resultants. Fig. 5 is a section on the resultant line 11' to be referred to.

The force transmitted by the driving gear is shown as a force O acting through point A, the pitch point of the mating gears. A—O is the line of action. This force is resolved into components as follows—Force 1 acting in a line tangential to the gear in the plane of the gear; force 2, due to the helix angle, acting parallel to the axis of the gears; and force 3 due to the pressure angle acting vertically upward.

These forces 1, 2, 3 are now to be transferred to the axis of the driven gear. They become forces 1', 2', and 3' as shown, equal and parallel to forces 1, 2, and 3 respectively, a couple marked 4 which drives the vehicle, and a couple marked 5' in the vertical plane through the axis equal to force 2' times the radius of the gear.

The resultant of forces 1' and 3' appears at 7'. The forces 7', 2' and couple 5' are now transferred to the planes of support of the gear. These planes are (see Fig. 5) the central plane through the clutch end of the gear meeting the axis at C, and the central plane through the taper bearing remote from the clutch end, meeting the axis in point D.

Force 7' has two components, 8 at C and 9' at D (see Fig. 4). Couple 5' is resolved into two equal and opposite forces 6 and 6', acting downward at C and upward at D. Forces 8 and 6 have a resultant 10. Forces 9' and 6' have a resultant 11' representing the radial load on the taper bearing.

Force 2' is transferred to point E. This gives an axial force 2" equal to and parallel to force 2', and a couple 2' times $r$ represented by two equal forces 12' upward at E and 12 downward at C.

Fig. 4 shows at 13' the resultant of forces 12 and 10 which resultant is the total radial load on the clutch teeth.

In Fig. 5 is shown at 14 the resultant at E of forces 11', 12', and 2". It will be evident from this figure that provided force 14 lies at the left of EF, a line normal to the conical surface at E, the gear tends to move up, not down, the tapered slope and thereby this part of the gear also is held centralized on the shaft.

In the claims the term "tapered bearing" is used to mean a bearing, whether of the plain, ball, or roller type, wherein the line through the contact points of the gear carried element and the shaft carried element is at an angle to a plane normal to the shaft.

Fig. 2 is a slightly modified form. In this figure is shown an embodiment wherein an effort has been made to additionally space the tapered bearings associated with each gear element. Gear 55' is elongated as at 101. Owing to its elongation and the location of one of the tapered bearings between it and the shaft under the elongation of the gear, the two tapered bearings are spaced farther apart and the danger of axial displacement of the gear is still further reduced. 103 and 105 represent the inner races supporting the tapered bearings for gear 55'. These races are spaced by a ring 107. Another inner bearing race is shown at 109. The bearing engaging this race engages the angular face on gear 83'. Gear 83' differs from gear 83 by the provision of an elongation 111 overlying the elongation 101 from gear 55', and a second tapered bearing is located between these two elongations as shown. In this way the supporting tapered bearings for both gears are well spaced to prevent any axial displacement of the gears. Gear 83' turns about its bearing on the shaft at one point and at another point it is rotatably supported by the elongation of the gear 55', which gear is itself rotatably supported on the shaft. The objects and advantages to be attained in this second embodiment are the same as before, the provision of additional spacing between the tapered bearings for each gear lessening the danger of axial displacement.

It will be understood that one of the tapered roller bearings for each gear receives the thrust and centers the gear for one direction of loading and the other bearing similarly functions for the opposite direction of loading. While both forms of the invention are shown with tapered rollers, it will be understood that bearings of other types may be used provided the conditions stated above are present.

I claim:

1. A shaft, a helical gear, said gear adapted to operate in driving relation with a second gear, means adjacent one axial end of said helical gear to center the gear, tapered bearing means to rotatably support said gear at a position removed from said centering means, the angle between the shaft axis and the normal to a point on the bearing surface of the gear engaging said bearing being greater than the angle determined by said shaft axis and the resultant of the force components acting upon said gear at said point to displace the gear from coaxial relation to the shaft.

2. A shaft, a helical gear, said gear being adapted to operate in driving engagement with a second gear, spaced tapered bearings to rotatably support said helical gear, the angle, in the case of said bearing, between the shaft axis and a normal to the bearing face of the gear being greater than the angle between said axis and the resultant of the force components acting through said bearing face and tending to displace said gear from coaxial relation with said shaft.

3. The invention defined by claim 2 together with a clutch member slidable and non-rotatable on said shaft, said clutch member and said helical gear having cooperating teeth to lock said helical gear from rotation relative to said shaft and to hold that portion of said helical gear in the region of the clutch teeth concentric with said shaft.

4. A shaft, spaced driven helical gears, means to rotate said gears, a plurality of tapered bearings between said gears and said shaft, a plurality of bearing races for said bearings on said shaft, an intermediate one of said races supporting adjacent bearings for supporting the two gears.

5. The invention defined by claim 4 together with clutches slidable and non-rotatable on said shaft, one to engage each of said gears, the angle between the shaft axis, in the case of each of said bearings, and the normal to the gear face engaging the bearing being greater than the angle between the said axis and the resultant of the force components acting upon said gear face to displace it from coaxial relation with the shaft.

6. A shaft, helical gears, said gears having radially unequal overlapping elongations, tapered bearings between said elongations, a plurality of tapered bearings between that gear having the elongation of lesser radius and the shaft, and a single tapered bearing between the other gear and said shaft whereby the gears are maintained in concentric relation by said spaced tapered bearings.

7. The invention defined by claim 6, each of said gears having remotely located clutch teeth, and a plurality of clutch means slidable and non-rotatable on said shaft to engage and hold said gears from rotation relative to said shaft, the angle between the shaft axis, in the case of each of said bearings, and the normal to the gear face engaging said bearing being greater than the angle between said axis and the resultant of the force components acting on said face to displace said gear from coaxial relation with the shaft.

8. A shaft, helical gears, said gears having radially unequal overlapping elongations, tapered roller bearings between said elongations, a plurality of tapered roller bearings between the shaft and one of said gears, and a single tapered roller bearing between said shaft and the other bearing.

9. A shaft, a helical gear having clutch teeth, means in driving engagement with said gear, a clutch element movable to engage said clutch teeth and thereby center said gear on said shaft in the plane of the clutch elements, a tapered bearing between said shaft and said helical gear, the angle between the axis of said shaft and the normal to the face of the gear engaging said bearing being greater than the angle between said axis and the resultant of the force components acting on said surface to displace the gear from coaxial relation with the shaft.

10. A shaft, a helical gear having clutch teeth, means in driving engagement with said gear, a clutch element movable to engage said clutch teeth and thereby center said gear on said shaft in the plane of the clutch elements, a tapered bearing between said shaft and said helical gear for supporting and centering said gear, the plane of the clutch elements being at one side and the plane of the bearing being at the other side of the mid plane of the gear, the angle between the axis of said shaft and the normal to the face of the gear engaging the bearing being greater than the angle between said axis and the resultant of the force components acting on said face to displace said gear from coaxial relation with said shaft.

11. A shaft, a helical gear, means to rotate said gear, clutch means including cooperating parts slidably splined to the shaft and carried by the gear respectively whereby the engagement of said clutch parts locks the gear from rotation relative to the shaft and centers the gear in the plane of the shaft, and tapered bearing means to support the gear in a plane removed from the clutch, and operable by axial movement of the gear to center the same, the angle between the shaft axis and the normal to a point on the bearing surface of the gear engaging said bearing being greater than the angle determined by said shaft axis and the resultant of the force components acting upon said gear at said point to displace the gear from coaxial relation to the shaft.

EARL A. THOMPSON.